(12) United States Patent
McKernan et al.

(10) Patent No.: US 7,941,502 B2
(45) Date of Patent: *May 10, 2011

(54) METHOD AND SYSTEM FOR MIGRATING CONTENT ON A NETWORK

(75) Inventors: James McKernan, Ashland, OR (US); Nojan Moshiri, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/792,537

(22) Filed: Jun. 2, 2010

(65) Prior Publication Data

US 2010/0238945 A1    Sep. 23, 2010

Related U.S. Application Data

(63) Continuation of application No. 10/676,696, filed on Sep. 30, 2003, now Pat. No. 7,765,272.

(51) Int. Cl.
    *G06F 15/16* (2006.01)
    *G06F 15/177* (2006.01)

(52) U.S. Cl. ...................................... 709/217; 709/223

(58) Field of Classification Search .................. 709/217, 709/223

See application file for complete search history.

(56) References Cited

U.S. PATENT DOCUMENTS

| | | | |
|---|---|---|---|
| 5,832,522 | A | 11/1998 | Blickenstaff et al. |
| 6,507,854 | B1 | 1/2003 | Dunsmoir et al. |
| 6,651,066 | B2 | 11/2003 | Baxter et al. |
| 7,080,148 | B2 * | 7/2006 | Weigand ........................ 709/228 |
| 7,085,883 | B1 | 8/2006 | Dalgic et al. |
| 7,155,462 | B1 | 12/2006 | Singh et al. |
| 7,167,914 | B2 | 1/2007 | Cohen et al. |
| 7,225,460 | B2 | 5/2007 | Barzilai et al. |
| 7,287,217 | B2 | 10/2007 | Kuznetsov et al. |
| 7,379,996 | B2 | 5/2008 | Papatla et al. |
| 7,765,272 | B1 * | 7/2010 | McKernan et al. ........... 709/217 |

OTHER PUBLICATIONS

Stolowitz Ford Cowger LLP, Listing of Related Cases, Nov. 30, 2010.

* cited by examiner

*Primary Examiner* — Hussein A Elchanti
(74) *Attorney, Agent, or Firm* — Stolowitz Ford Cowger LLP

(57) ABSTRACT

A method and system for migrating content on a network. In one method embodiment, the present invention accesses a directory having a network address. A business rule is created and a directory is scripted based on the business rule. Next, a content switch automatically directs future access to the directory to a new environment based on the scripting, wherein the future access to the directory uses the same network address. In so doing, the migration of content on a network is greatly simplified.

20 Claims, 8 Drawing Sheets

| | Future 510 | Current 520 | Content Rule Owner 530 | Ready for Migration 540 |
|---|---|---|---|---|
| 550 | /it/news | /cust adv/infosys/news | IT | Yes |
| 560 | /it/health | /custadv/infosys/health | IT | No |
| 570 | ... | ... | ... | ... |

METHOD AND SYSTEM FOR MIGRATING CONTENT ON A NETWORK

RELATED APPLICATIONS

This application is a continuation of U.S. patent application Ser. No. 10/676,696, filed on Sep. 30, 2003, now pending, the disclosure of which is herein incorporated by reference.

FIELD OF THE INVENTION

The present claimed invention relates to the field of computing networks. Specifically, the present claimed invention relates to a method and system for migrating content on a network.

BACKGROUND ART

The growth of the Internet over the past decade has provoked a tremendous rush to adoption of web sites by almost every company doing business today. This rush has included both internal (Intranet) presence as well as external (Internet) based presence. These myriad web sites each face the problem of web migration individually, so one company may have to tackle the challenge of web migration once for each unique environment it has built and supported.

The problem has to do with the rapid change of technology. By the time a large web site is complete it quickly becomes outdated. In the intervening years since web sites are built and deployed, technology continues to march forward while both static and dynamic web sites are frozen in time and lag behind. Sites are often trapped by the inability to make large-scale changes without impacting stability and customer satisfaction.

In short, once a web site is built and deployed, keeping up-to-date on upgrades (both software and hardware), the latest technologies, business process, etc., has meant a compromise between risking changes that might lower customer satisfaction or taking an extremely time-consuming and drawn out process that requires enormous personnel resources and devotion to quality assurance. In fact, web migration is quickly becoming one of the most important and costly challenges facing any business with a web presence.

SUMMARY OF INVENTION

The present invention provides, in various embodiments, a method and system for migrating content on a network. In one embodiment, the present invention accesses a directory having a network address. A business rule is created and a directory is scripted based on the business rule. Next, a content switch automatically directs future access to the directory to a new environment based on the scripting, wherein the future access to the directory uses the same network address. In so doing, the migration of content on a network is greatly simplified.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is an exemplary table of automation technique used to allow for the addition or change of hundreds of rule sets via extensible markup language (XML) based rules in accordance with one embodiment of the present invention.

DESCRIPTION OF THE PREFERRED EMBODIMENTS

Figure 1:
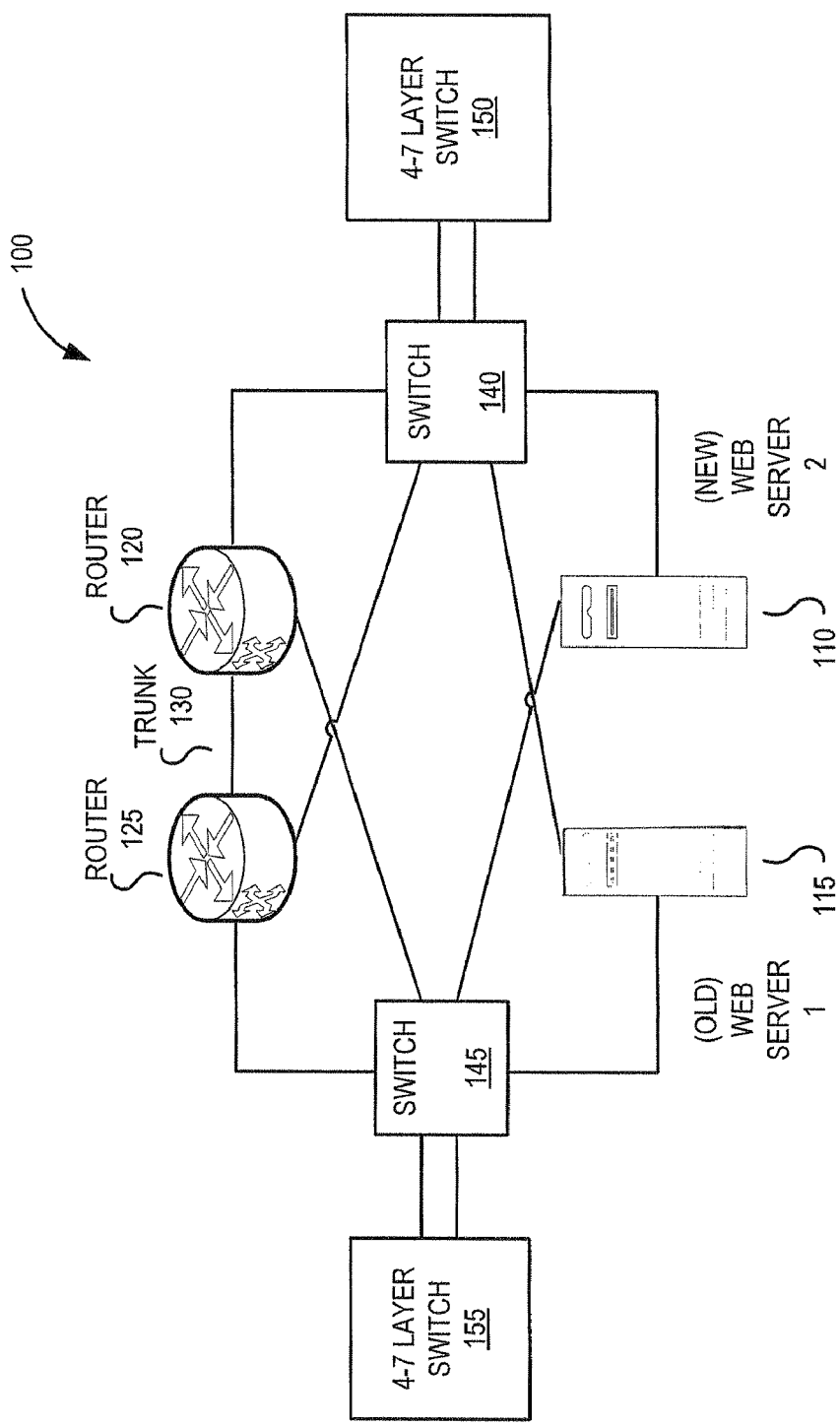
FIG. 1 is a block diagram of an exemplary network overview in accordance with one embodiment of the present invention.

In the following detailed description of the present invention, a method and system for migrating content on a network, specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating", "initiating", "accessing", "transmitting", "storing", "inputting", "rolling", "authorizing", "utilizing", "resolving", "processing" or the like, refer to the action and processes of a computer system (e.g., FIG. 8), or similar electronic computing device, that manipulates and transforms data represented as physical (electronic) quantities within the computer system's registers and memories into other data similarly represented as physical quantities within the computer system memories or registers or other such information storage, transmission or display devices.

The present invention described herein makes it possible to have thousands of simultaneous layer 4-7 rules on each device controlling traffic during web site renovation. For example, a web site that contains 750 top-level directories could be replaced, one directory at a time with no impact to performance, no URL changes and no impact to customer service.

In one embodiment, the techniques allow for the addition or change of hundreds of rule sets within seconds via XML based rule uploads. The rules are customer driven through the use of a spreadsheet template. The template allows content or application owners to build simple tables that are then parsed via scripts creating content switch compliant XML files. Then, the XML files are uploaded to the content switch via additional scripts.

Therefore, during large enterprise migrations or the build of additional platforms, these automation techniques greatly reduce the chance of human error as well as vastly improving productivity, while saving vast amounts of administration time.

With reference now to FIG. 1, a block diagram of an exemplary network for migrating content is shown in accordance with one embodiment of the present invention. Network 100 may be the network standard of a redundant topology and load balanced on the switch side. However, network 100 does not require redundancy or load balancing on the switch side it is merely an embodiment.

Network 100 includes routers 120 and 125 connected via trunk line 130. Network 100 also includes switches 140 and 145 which may be transparent switches to direct content to the routers. Network 100 also includes web servers 110 and 115 which are well known in the art. These components (e.g., routers 120 and 125, switches 140 and 145, and web servers 110 and 115) may be any of a number of devices known by one in the art. In addition, any well-known communications technology (e.g., wired or wireless) may be used to connect these devices (e.g., full gigabyte structure).

Figure 2:
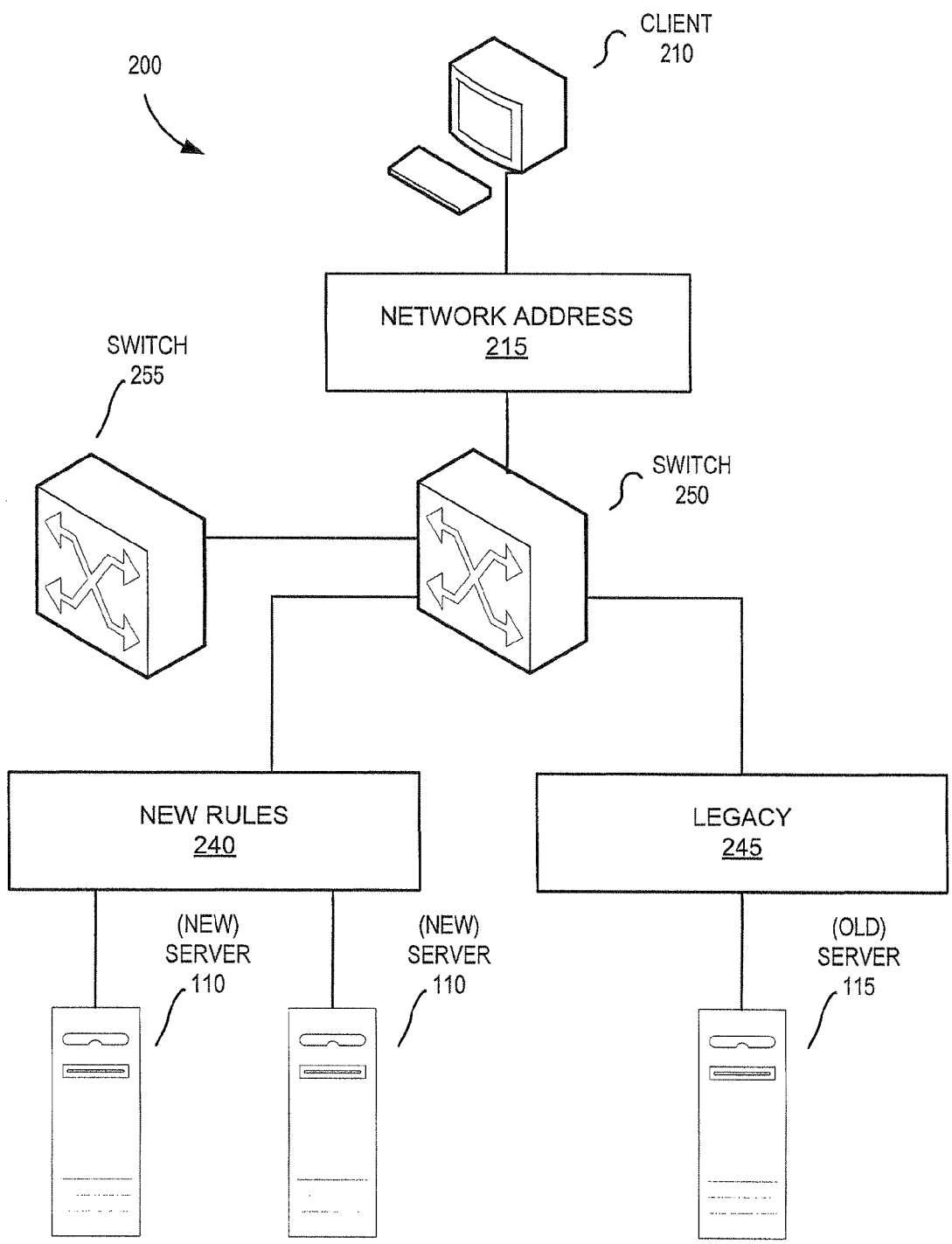
FIG. 2 is a block diagram of an exemplary network for migrating content 10 on a network in accordance with one embodiment of the present invention.

Referring still to FIG. 1, network 100 includes layer 4-7 switching technology shown as 4-7 layer switches 150 and 155. However, as shown in FIG. 2, the 4-7 layer switches 150 and 155 may be incorporated into switches 140 and 145. That is, the layer 4-7 switching technology may be an additional stand-alone portion of the network structure, or it may be integrated with the regular switching processes performed by switches 140 and 150.

In general, network 100 shows the connection of two web servers connected to the network. The two servers illustrate one embodiment, wherein an old environment (e.g., stored on server 115) and a new environment (e.g., stored on server 110) are operating in the same network and the switches 140 and 145 and 4-7 15 layer switches 150 and 155 may direct content between the router and the old or new (e.g., server 115 or 110) environment.

With reference now to FIG. 2, a block diagram of an exemplary network 200 for migrating content on a network is shown in accordance with one embodiment of the present invention. In general, FIG. 2 is a logical perspective of the hardware in the network. That is, network 200 shows one embodiment of the hardware and the exemplary actions thereof. The client 210 of network 200 may be a computing system similar to computing system 800 of FIG. 8. The rest of network 200 may also be similar to that of network 100.

In one embodiment, the client 210 accesses a network and requests a database via a network address 215. The client 210 may access the network via a wired or wireless connection. In addition, client 210 may use the Internet or Intranet to access the network. Once switch 250 (e.g., a 4-7 layer switch) receives the network address 215 request from client 210 the switch 250 directs the access request to the server supporting the network address 215.

For example, if the network address 215 is for an address on the legacy 245 server 115, then the switch 250 will direct the client 210 request to server 115. However, if the network address 215 is for an address on the legacy server which has been migrated to the new servers 110, then the switch 250 will automatically direct the client 210 to access the new server 110 instead of the legacy server 115. This automatic redirection to the new server 110. In one embodiment, this may occur without requiring an update to the network address 215 utilized by client 210.

That is, the migration architecture may seamlessly deliver content and applications from the old monolithic environment and the new load balanced environment with the same virtual Internet protocol. This is accomplished through layer 4-7 content rules and automation techniques described herein. For example, the present invention may seamlessly and automatically redirect the client 210's request to the correct server location without requiring a change to the network address 215 and without first accessing the legacy 245 location for further direction regarding the location of the desired network address 215.

Figure 3:
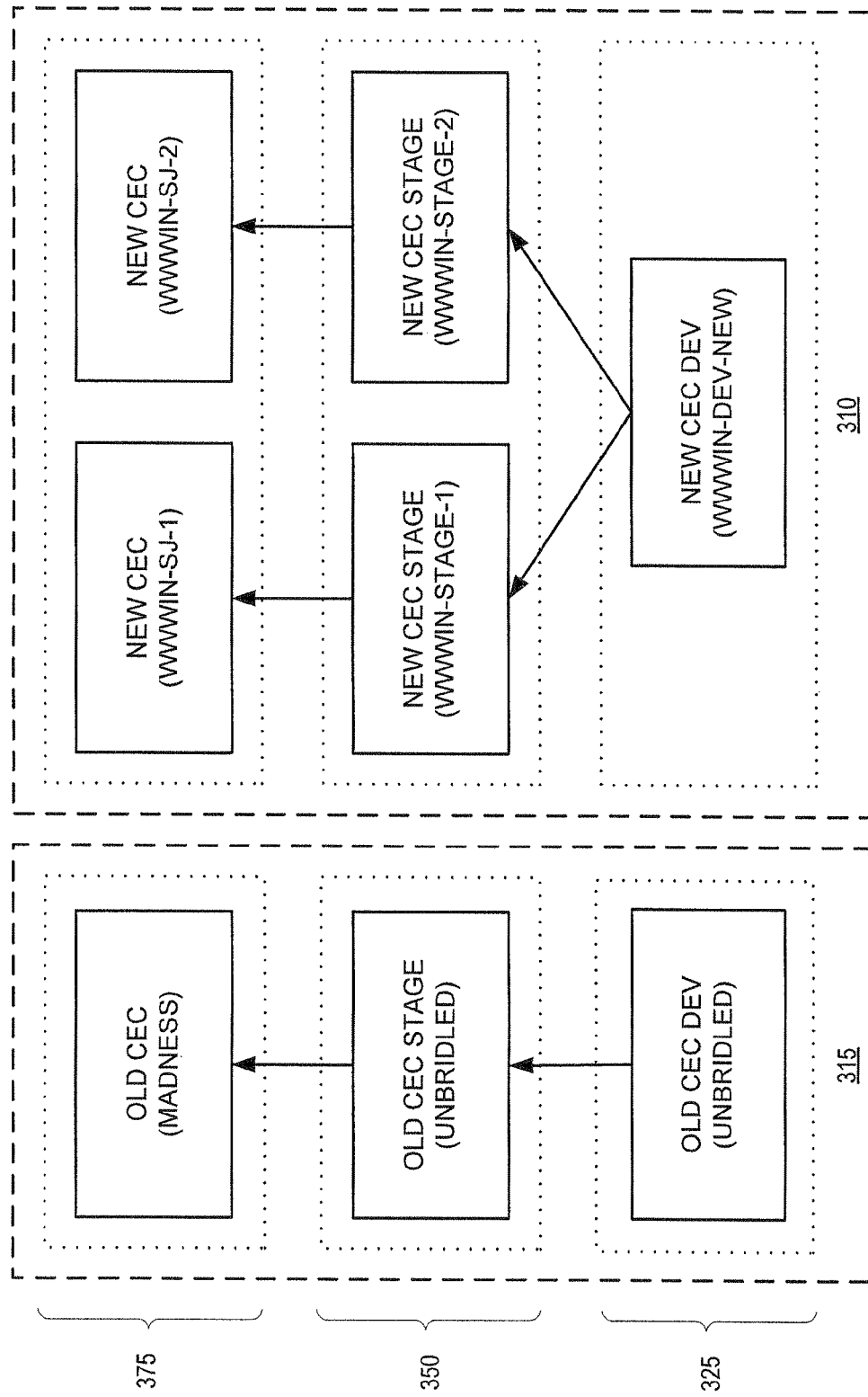
FIG. 3 is a chart of an exemplary business structure for migrating content on a network in accordance with one embodiment of the present invention.

In another embodiment, the new server 110 and the old server 115 may be two partitions on the same server instead of two separate servers as shown in FIG. 3. That is, the method for migrating content may be performed on the same server. In addition, the method for migrating content may be performed on more than two servers.

With reference now to FIG. 3, an exemplary chart of a business structure for migrating content on a network is shown in accordance with one embodiment of the present invention. FIG. 3 includes the new environment 310 and the old environment 315. Furthermore, FIG. 3 illustrates the logical distinction of the three business environments utilized in one exemplary business method. In one embodiment, the three environments are development 325, staging 350, and production 375. The environments may be on separate subnets and virtual local area networks (VLAN's).

Development 325 may be the stage in the business structure wherein initial changes to a network are proposed. For example, if a need to upgrade, move, or the like is necessary, then the development 325 stage is utilized as the initial starting point. In the old environment 315, each stage (e.g., development 325, staging 350, and production 375) was limited to a single action. In the new environment 310, the next stage (e.g., staging 350) provides the developer with at least two choices. Although two choices are shown in the staging 350 of new environment 310, there may be 2000 choices. The use of two choices in the staging 350 environment is merely for clarity.

Staging 350 may be the point in the business structure wherein integration and business decisions (e.g., rules) are performed. That is, the plans and architecture for the web-based migration are decided there. For example, the entire data set delegated to each staging partition may be analyzed for replacement of servers or upgrade of servers, requiring a migration. Therefore, the staging 350 phase of the new environment 310 may change the architectural map of the switch to utilize a new Internet service provider (ISP) address or Internet protocol (IP) address when an original (e.g., non-modified) network address (e.g., URL) is provided to the switch. In one embodiment, the rules may be in the form of a spreadsheet, a document, a database, etc. In one embodiment, as shown in. FIG. 5, a spreadsheet is utilized. However, as stated herein, the rules may be organized in any manner in which data can be tabulated and saved.

Production 375 may be the reduction-to-practice of the rules developed in the staging 350 portion to an actual layer 4-7 switch in the network. That is, after the staging 350 has constructed the rules for migration based on the desired client business rules, the rules are put into production 375.

For example, production 375 implements the rules established by staging 350 to allow the migration architecture to seamlessly delivers content and applications from the old monolithic environment and the new load balanced environment with the same virtual Internet protocol. For example, when a client requests a network address, the production 375 allows the switch to seamlessly and automatically redirect the client 210's request to the correct server location without requiring a change to the network address and without first accessing the legacy location. In addition, if the production 375 has no updated staging 350 direction regarding a network address, it may default all references to the old address. In another embodiment, the default may be directed to anywhere that is desired by the network administrator designing the business rules.

Although a production portion 375 is shown as a one-for-one match with staging portion 350, there may be more or less production portions 375 than staging portion 350. The numbers shown herein are merely for purposes of clarity.

Figure 4:
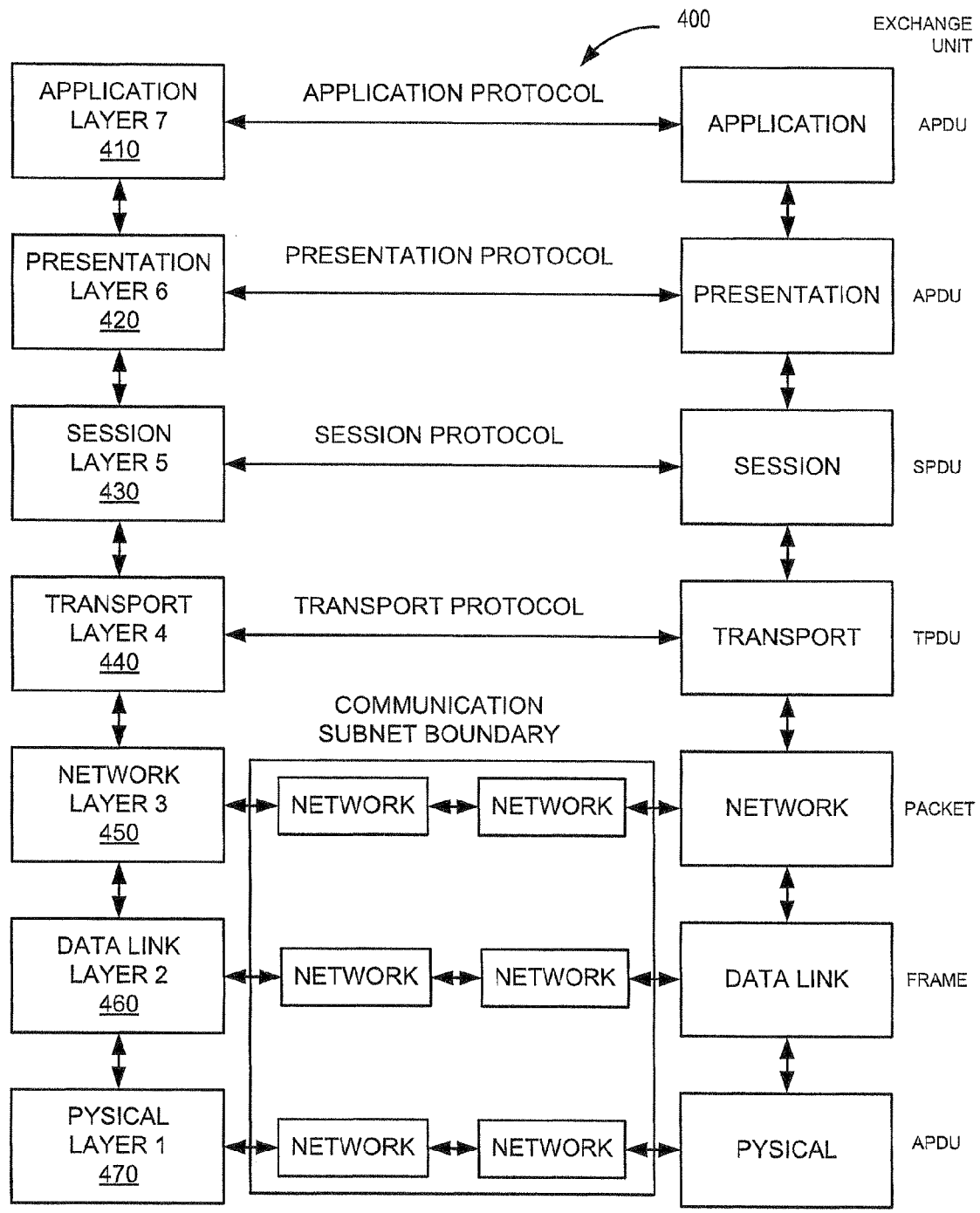
FIG. 4 is a block diagram of an exemplary table of 7-layer protocol in accordance with one embodiment of the present invention.

With reference now to FIG. 4, a block diagram of an exemplary table of the entire 7-layer protocol is shown in accordance with one embodiment of the present invention. In general, layer 4-7 switching refers to software and hardware-based management of Internet/intranet traffic based on attributes found at or above the protocol layer of the IP packet. Layer 4-7 switches can read application-level information in packet headers—such as what type of user or device is requesting the content (handheld device, frequent shopper, first-time visitor, etc), and what type of content the user is requesting (executable script, static content, streaming Webcast, shopping cart, etc.) This information enables the switch to intelligently distribute requests to the most suitable server, based on geographic location, latency, server load, or other factors that would be unknown to Layer 2/3 routers and switches.

Layer 4-7 switches also work in harmony with content caches, security processors, and other purpose-specific components to extend content awareness and traffic-management intelligence to a complete content distribution network. In general, the seven-layer protocol stack in the Open Systems Interconnection (OSI) data connectivity model includes: Layer 1 (physical 470), Layer 2 (data link 460), Layer 3 (network 450), Layer 4 (transport 440), Layer 5 (session 430), Layer 6 (presentation 420), and Layer 7 (application 410). Standards-compliant devices agree on conventions for describing the attributes of a network connection at each level.

The Layer 2 (interface, Ethernet) section of a packet header may contain an 802.1p code that specifies priority. The Layer 3 (Internet) portion of the packet header may include a ToS (type of service) field that indicates desired service level. The Layer 4 (transport, TCP, UDP, etc.) layer of the packet may include a port number that identifies the application, since certain types of applications/services are usually associated with designated port numbers, by agreement.

By utilizing Layer 4-7 switching the ability to make switching decisions based on awareness of users and content enables Layer 4-7 switches to support a number of advanced services, such as but not limited to: Intelligent load balancing across servers, firewalls, and many other devices based on sophisticated load-balancing algorithms, content, and policies; continuous health-checking; support for backup and overflow devices; and active-active redundant switch configurations—to ensure that requests are efficiently sent to and served by the most appropriate network device.

Content-intelligent application redirection based on full Layer 7 inspection of URLs, cookies, and host headers across multiple requests and responses, applied against powerful filtering rules. 'Cookie-aware' differentiated services, such as special treatment for frequent shoppers versus casual browsers—plus differentiated bandwidth and jitter characteristics for different types of content based on awareness of the requested URL, not just on IP address or application port.

Virtual hosting, by enabling a single public IP address to represent multiple domains, and automatically redirecting requests to the appropriate server or server farm. Persistent connections to improve session performance for eBusiness transactions (shopping carts and multi-page forms, for example) and wireless applications. Content-aware security that protects servers and applications against attacks and unwanted intrusion while providing continuous service for legitimate traffic.

With reference now to the table of FIG. 5, an exemplary automation technique used to allow for the addition or change of hundreds of rule sets within seconds via extensible markup language (XML) based rule uploads is shown. In one embodiment, the rules are user driven through the use of a template (e.g., a spreadsheet 500). The template allows content or application owners to build simple tables that are then parsed via scripts to create layer 4-7 switch compliant XML files.

The XML files are then uploaded to the layer 4-7 switch via additional scripts. In general, table 500 may be used to maintain the migration in an organized format. For example, if the migration is large (e.g., tens of thousands of files and tens of thousands of gigabytes of content) an additional level of granularity may be used by the migration. These "complex" migrations may necessitate the management of the content rules on a second or third level from the web server 20 root. Therefore, to manage both simple and complex migrations, a spreadsheet may be used for both staging and production of content rules.

In one embodiment, if the migration is complex, the spreadsheet 500 may have hundreds of records and a plurality of phases (some directories ready to migrate before others (e.g., ready for migration 540)). In another embodiment, if the migration is smaller, the spreadsheet 500 may have only a few records and only one phase. Table 500 includes future 510, current 520, content rule owner 530 and ready for migration 540. The spreadsheet 500 may be a scripting language written in Perl (or any other scripting language) for text manipulation. In general, the spreadsheet 500 may parcel text files, grab elements for migration, and reformat the parcels to switch compliant language such as XML or the like. Then, when the migration is performed, the switch compliant language is uploaded to the switch (e.g., a CSS or CSM switch) and the migration is complete.

In one embodiment, future 510 may be the new location that the switch will direct future accesses to the desired content (e.g., the migrated location). Current 520 may be the present location of the desired content to be migrated (e.g., the premigration location). Content rule owner 530 may be the group or personnel responsible for the operation or content which is being migrated (e.g., the management). Ready for migration 540 may be the preparedness of the desired content for migration (e.g., ready to migrate or not).

As described in detail herein, ready for migration 540 may be utilized to create a plurality of rule iterations. For example, if the status is set to yes a rule is created, if it is set to no, the record may be ignored by the switch language (e.g., XML) and no rule will be generated for the particular iteration. This may be used to migrate the database in a step type format, thereby allowing for another layer of architecture. In one embodiment, prior to the content rule generation for the specific iteration, the spreadsheet 500 is saved "as is" to provide a database of the content and migrations performed. This method of retaining the pre-migration data may provide for an efficient and quick rollback of the content switches thereby allowing the switches to direct access back to the original environment if a problem occurs post migration. switched, if any error occurs, the rollback is also seamless and efficient.

Figure 6:
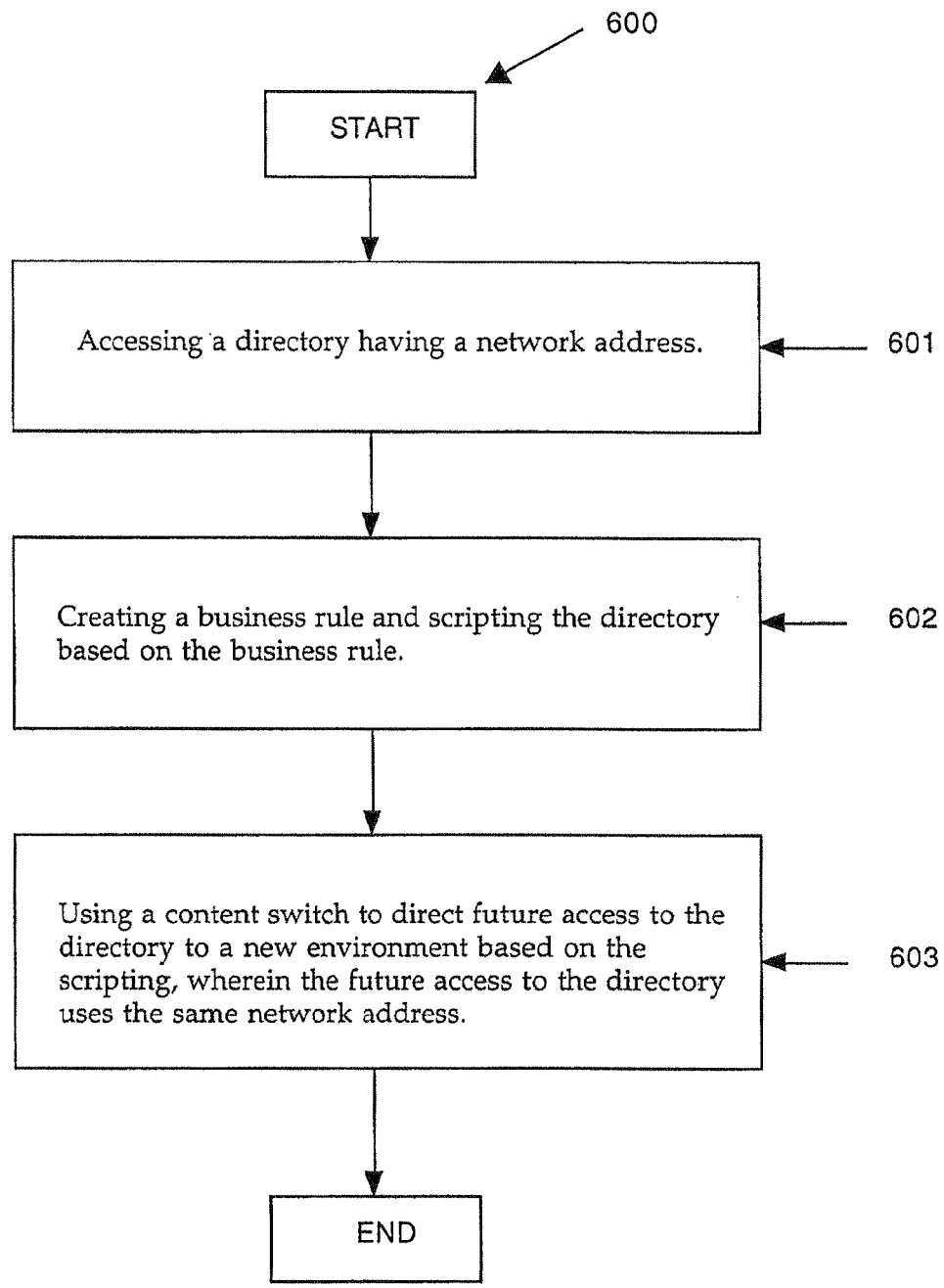
FIG. 6 is a flowchart of steps in an exemplary method for migrating content on a network in accordance with one embodiment of the present invention.

With reference now to FIG. 6, a flowchart of steps in an exemplary method for migrating content on a network is shown in accordance with one embodiment of the present invention. Referring now to step 601 of FIG. 6 and FIG. 2, a directory having a network address is accessed. In one embodiment, the access of the directory may be to prepare the directory for migration from one location on a network to another location on the network.

As described in detail herein, the migration may be from a first server 115 to a second server 110, or from one location on a first server 110 to another location on the first server 110. In general, the preparation for the migration also includes inputting the directory status into a spreadsheet template.

Status may include the directory location, the current rule owner, the operational status, the desired future location of the directory, or the like. In one embodiment, the spreadsheet may be any type of spreadsheet which utilizes a scripting language such as Perl and allows for text manipulation.

Inputting the directory status into the spreadsheet may also include building simple tables that are parsed with scripts to create switch compliant files. For example, as shown in Table 500 of FIG. 5, the tables may include columns such as future 510, current 520, content rule owner 530 and ready for migration 540.

Although the above mentioned columns are stated, it is appreciated that the spreadsheet may include more or less columns of information. For example, the table may include date columns, status columns, data type columns, or the like. In general, the spreadsheet 500 parcels text files, grabs elements for migration, and reformats the parcels to switch compliant language such as XML or the like. Then, when the migration is performed, the switch compliant language is uploaded to the content switch (e.g., a CSS or CCS switch) via additional scripts and the migration may be performed.

With reference now to step 602 of FIG. 6, and FIG. 3, in one embodiment a business rule is created and the directory is scripted based on the business rule. For example, FIG. 3 illustrates the logical distinction of the three business environments utilized in one exemplary business method. The three environments may be development 325, staging 350, and production 375. In one embodiment, the environments may be on separate subnets and virtual local area networks (VLAN's). Although three business rules are stated herein, a business model may have any number of business rules which may easily be utilized in place of the ones stated herein for exemplary purposes.

Referring now to step 603 of FIG. 6, a content switch may be used to automatically direct future access to the directory to a new environment based on the scripting, wherein the future access to the directory uses the same network address. In one embodiment, the content switch may be a layer 4-7 switch. As described herein, the new environment may be on a new server distinct from a server maintaining the old environment, or the new environment may be on the same server as the old environment, or the new environment may be partially on a new server distinct from the server maintaining the old environment and partially on the same server as the old environment.

In addition, the present embodiment may allow for rolling back the content switch to direct access to the old environment if the new environment is unacceptable. For example, if an error occurs during the migration of the directory or the new business or migration rules are not sufficient. Then, the initial spreadsheet may be accessed, and the content switch may be provided with a new set of directions which may return all (or a portion of) the migration back to the pre-migration status. Thus, if an error is found in all or a portion of the migration, the fix (or rollback) may be performed in a seamless and efficient manor thereby returning the network to operational status. In one embodiment, the rollback may return the directory to its last state previous to the migration. Therefore, the rollback not only allows for continued operation of the network, it also reduces any losses within the directory during the migration attempt.

Figure 7:
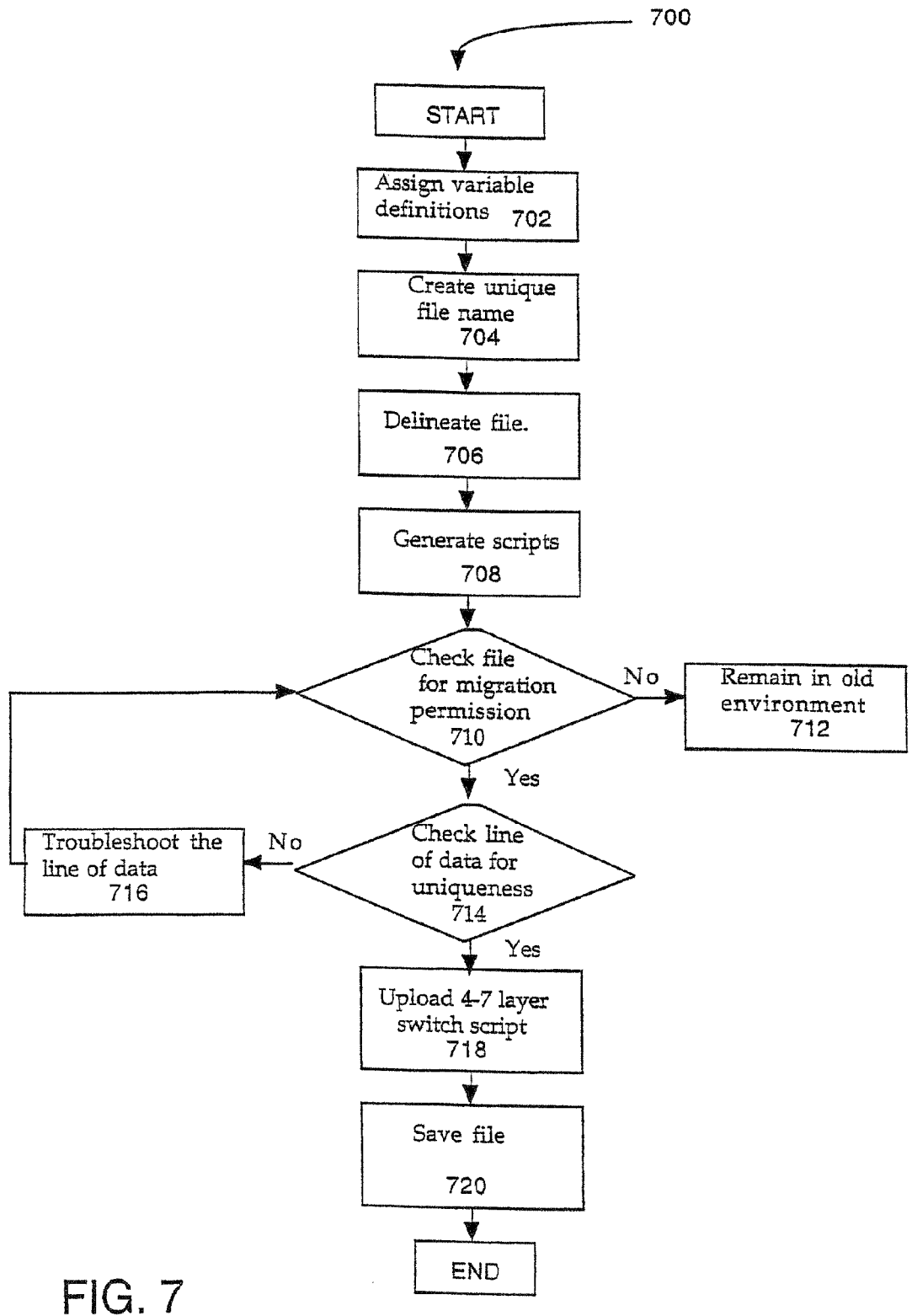
FIG. 7 is a flowchart of steps in an exemplary scripting process for generating content rules in accordance with one embodiment of the present invention.

Referring now to FIG. 7, a flowchart of an exemplary scripting process for establishing content rules in a layer 4-7 switch is shown. In general, flowchart 700 is one of the many possible scripting method embodiments which may be used to perform the process of web migration and is included herein for purposes of clarity. The purpose of flowchart 700 may be to generate content rules (e.g., XML, Java, etc.) based on a delineated text file (e.g., tab separated, space separated, punctuation separated, or the like) exported from a spreadsheet.

With reference now to step 702 of FIG. 7, in one embodiment variable definitions are assigned. The variables may include any or all of a set number, a directory address, a rule name (for the rule to be scripted from the directory), and a log file name. In one embodiment, these variables may be canned for a specific 20 implementation of an enterprise Intranet environment following the three-tier development model (dev/stage/prod) as described herein. The names of the content switch services as well as XML Header and content switch compliant strings are also assigned. In general, the names may be of any type, but are normally descriptive, for maintenance and troubleshooting purposes. In one embodiment, stage and production may be load balanced and in one embodiment may be scripted with virtual Internet protocols (VIPs). For example, the script may include a VIP address, a protocol (e.g., transmission control protocol (TCP)), a port address, any services which may be added, and/or content, owner, and configuration details.

With reference now to step 704 of FIG. 7, in one embodiment, a unique file name is created for each implementation. This unique file name provides tracking and revision control. For example, if a migration occurs for a number of files, if each file has a unique name, then a user may access the file for any errors or revisions without having to search through lines of code or large file structures regarding the entire migration.

Referring now to step 706 of FIG. 7, in one embodiment, the file is delineated. For example, the file may be tab separated, punctuation separated, or any other type of separation which may be recognized be the computing program. In addition, the file may include the type of delineation used. For example, if the file is a tab separated text file from a spreadsheet, it may include a statement such as "This is the Content Rule generation script for CEC research. It requires a tab separated local text file exported from a valid and complete spreadsheet."

With reference now to step 708 of FIG. 7, in one embodiment, a generation of the file (e.g., directory) script for stage and production is performed. For example, an array may be split into variables and processed for each element. With reference now to step 710 of FIG. 7, in one embodiment the file is checked for permission to begin phased migration. If the record does not have a "yes" in migration field, (step 712) rules may not be generated for it and the file will remain in the old environment. This translates into "direct to old environment, unless told explicitly to go to the new environment. However, if the record does have a "yes" in the migration field, then ruled will be generated for it.

Referring now to step 714 of FIG. 7, the line of data is checked for uniqueness to the migration. For example, the unique owner may be a layer 4-7 content switch having an implementation that allows for security and autonomy between different migrations. If the line of data is not unique then it is not uploaded to the layer 4-7 switch. Then (step 716) the file is flagged for troubleshooting and then proceeds to step 710. In one embodiment, any badly formed rule name strings may be cleaned up, and then rule sets may be created for the new, environment, the old environment, or both the new and the old environments.

With reference now to step 718 of FIG. 7, in one embodiment, if the line of data is unique then it is uploaded to the switch. In one embodiment the uploaded portion of script may be an XML code snippet portion. Referring now to step 720 of FIG. 7, the migration file is then saved in the database for future use. For example, if a rollback is required, the saved file may be instantly accessed and all migrations which occurred may be undone in the same efficient manner. Furthermore, if a managerial, technical, or business question arises in the future, the exact migration may be examined.

Figure 8:
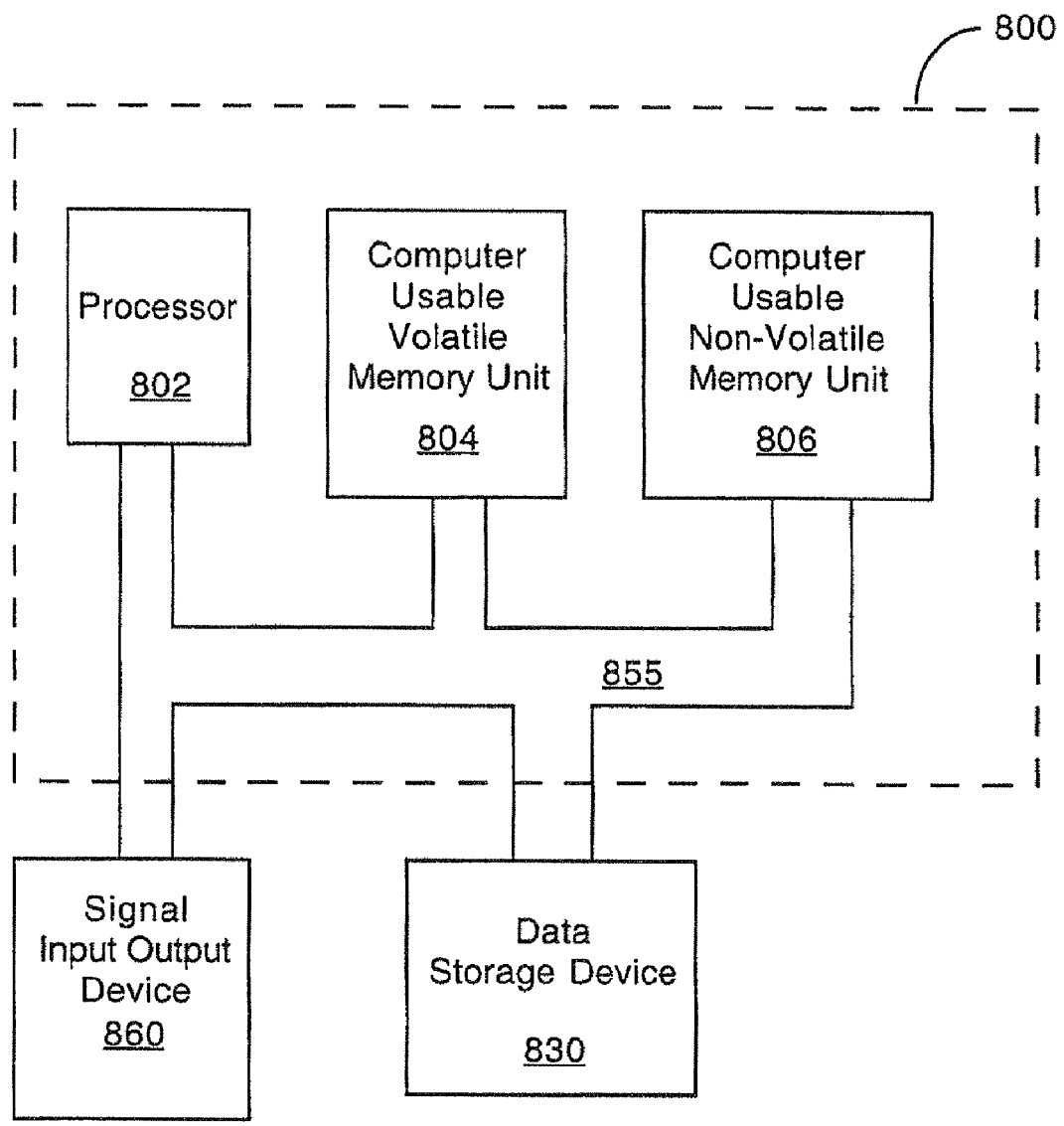
FIG. 8 is a block diagram of exemplary circuitry of a computing system that may be used as a platform to implement embodiments of the present invention.

With reference now to FIG. 8, a block diagram of an exemplary computer system 800 used is illustrated in accordance with embodiments of the present invention. System 800 of the present embodiment is well suited to be any type of computing device (e.g., server computer, portable computing device, desktop computer, etc.). Within the discussions of embodiments of the present invention, certain processes and steps are discussed that are realized, in one embodiment, as a series of instructions (e.g., software program) that reside within computer readable memory units of computer system 800 and executed by a processor(s) of system 800. When executed, the instructions cause computer 800 to perform specific actions and exhibit specific behavior that is described in detail herein.

Computer system 800 of FIG. 8 comprises an address/data bus 855 for communicating information, one or more central processors 802 coupled with bus 855 for processing information and instructions. Central processor unit(s) 802 may be a microprocessor or any other type of processor. The computer 800 also includes data storage features such as a computer usable volatile memory unit 804 (e.g., random access memory, static RAM, dynamic RAM, etc.) coupled with bus 855 for storing information and instructions for central processor(s) 802, a computer usable non-volatile memory unit 806 (e.g., read only memory, programmable ROM, flash memory, EPROM, EEPROM, etc.) coupled with bus 855 for storing static information and instructions for processor(s) 802.

System 800 also includes one or more signal generating and receiving devices 808 coupled with bus 855 for enabling system 800 to interface with other electronic devices and computer systems. The communication interface(s) 808 of the present embodiment may include wired and/or wireless communication technology. For example, within the present embodiment, the communication interface 808 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

The system 800 of FIG. 8 may also include one or more optional computer usable data storage devices 830 such as a magnetic or optical disk and disk drive (e.g., hard drive or floppy diskette) coupled with bus 855 for storing information and instructions.

Thus, the present invention provides, in various embodiments, a method and system for migrating content on a network. In one method embodiment, the present invention accesses, a directory having a network address. The present invention then creates a business rule and scripts a directory based on the business rule. Next, the present invention uses a content switch to (automatically direct future access to the directory to a new environment based on the scripting, wherein the future access to the directory uses the same network address. In so doing, the present invention simplifies the migration of content on a network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A system comprising:
a memory unit for storing data including a current network address and a new network address; and
a content switch configured to:
read application-level information in a packet header, wherein the application-level information corresponds to Open Systems Interconnection data connectivity model layer 7, and wherein the content switch is further configured to receive a request to access the current network address, wherein the request comprises the packet header;
read the application-level information provided in the packet header;
look-up the new network address from the memory unit including a directory;
input the directory into a spreadsheet template;
create a business rule and parse the directory using scripting based on the business rule;
initially automatically direct the request to access the current network address to the new network address based on the application-level information; and
subsequently automatically redirect subsequent requests to access the current network address to the new network address based on the scripting if no error occurs corresponding to the initial automatic directing, else automatically redirect the subsequent requests to access the directory to the current network address if an error occurs during the initial automatic directing.

2. The system of claim 1 wherein the spreadsheet template comprises switch compliant files.

3. The system of claim 2 wherein the switch compliant files are in extensible markup language (XML) format.

4. The system of claim 3 wherein the switch compliant files are uploaded to the content switch via scripts.

5. The system of claim 1 wherein the new network address is associated with data that resides on a server distinct from a server maintaining data associated with the current network address.

6. The system of claim 1 wherein the new network address is associated with data that resides on a same server as data associated with the current network address.

7. The system of claim 1 wherein the new network address is associated with data that partially resides on a new server distinct from a server maintaining data associated with the current network address.

8. A non-transitory computer-readable medium having instructions stored thereon, wherein when the instructions are executed by at least one device, the instructions are configured to cause the device to:
   receive a packet including a request to access a current network address;
   reformat a migration file comprising a plurality of network entries associated with one or more current network addresses including the requested current network address, and further associated with one or more new network addresses corresponding to the one or more current network addresses, wherein the migration file is reformatted using a switch compliant language;
   update a first switch compliant file with the reformatted migration file comprising the plurality of network entries to create a second switch compliant file comprising a new network address corresponding to the requested current network address; and
   direct the request for access to the current network address to the new network address based on switching instructions provided in the second switch compliant file, wherein if an error occurs associated with the switching instructions in the second switch compliant file, then restore the first switch compliant file and redirect a subsequent request to access the current network address according to switching instructions provided in the first switch compliant file.

9. The non-transitory computer-readable medium of claim 8 wherein the first and second switch compliant files comprise an extensible markup language (XML) format.

10. The non-transitory computer-readable medium of claim 8 wherein the new network address is associated with data that resides on a new server distinct from a server maintaining data associated with the current network address.

11. The non-transitory computer-readable medium of claim 8 wherein the new network address is associated with data that resides on a same server as data associated with the current network address.

12. The non-transitory computer-readable medium of claim 8 wherein the new network address corresponds with data that is partially stored on a new server distinct from a server maintaining data corresponding with the current network address.

13. A method for migrating content on a network comprising:
   storing data including a current network address and a new network address;
   receiving a packet including a request to access the current network address;
   reading application-level information in a header of the packet, wherein the application-level information corresponds to Open Systems Interconnection data connectivity model layer 7;
   accessing a database containing at least one directory;
   inputting the directory into a spreadsheet template;
   creating a business rule and scripting the database based on the business rule; and
   automatically redirecting future access to the directory to a new environment associated with the new network address based on the scripting if no error occurs corresponding to the redirecting, else automatically directing future access to the directory to an old environment associated with the current network address if an error occurs during redirecting.

14. The method of claim 13 further comprising building the spreadsheet template using simple tables parsed with scripts to create switch compliant files.

15. The method of claim 14 further comprising inputting a directory status into the spreadsheet template, wherein the directory status includes one or more of the following: a directory location, a current rule owner, an operational status and a future location of the directory.

16. The method of claim 15 wherein the new environment is on a separate subnet from the old environment and wherein the new environment may be associated with a different virtual local area network (VLAN) from the old environment.

17. The method of claim 13 further comprising determining whether to redirect access to the new environment based on one or more errors associated with one or more previous requests to access particular content residing in the old environment.

18. The method of claim 13 wherein the new environment is on a same server as the old environment.

19. The method of claim 13 wherein the new environment is partially stored on a new server distinct from a server maintaining the old environment and the same servers as an old environment.

20. The method of claim 13 further comprising seamlessly delivering content and applications from the old environment and the new environment using a same virtual Internet protocols.

* * * * *